(12) United States Patent
Nakamura et al.

(10) Patent No.: US 9,229,441 B2
(45) Date of Patent: Jan. 5, 2016

(54) SYSTEM CONSTRUCTION SUPPORTING TOOL AND SYSTEM CONSTRUCTION SUPPORTING DEVICE

(75) Inventors: Hiroyuki Nakamura, Chiyoda-ku (JP); Yuzuru Tone, Tokyo (JP); Koji Aoyama, Tokyo (JP); Tomohiro Okada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 456 days.

(21) Appl. No.: 13/881,288

(22) PCT Filed: Nov. 19, 2010

(86) PCT No.: PCT/JP2010/070726
§ 371 (c)(1),
(2), (4) Date: Apr. 24, 2013

(87) PCT Pub. No.: WO2012/066683
PCT Pub. Date: May 24, 2012

(65) Prior Publication Data
US 2013/0226331 A1 Aug. 29, 2013

(51) Int. Cl.
*G05B 15/02* (2006.01)
*A61B 19/00* (2006.01)
(Continued)

(52) U.S. Cl.
CPC .............. *G05B 19/04* (2013.01); *G05B 19/042* (2013.01); *G05B 19/05* (2013.01); *G06F 17/50* (2013.01);
(Continued)

(58) Field of Classification Search
CPC ............... G05B 15/02; G05B 19/0426; G05B 2219/25071; G05B 2219/25067; G05B 2219/23258; G05B 19/05; G05B 2219/15078; G05B 2219/14046; G05B 2219/13139
USPC ............................... 700/275, 287, 90, 276, 94
See application file for complete search history.

(56) References Cited

U.S. PATENT DOCUMENTS

2002/0040286 A1* 4/2002 Inoko ..................... G05B 19/05
703/13
2006/0206217 A1* 9/2006 Fujii ....................... G05B 19/05
700/18
2009/0024230 A1 1/2009 Hioka et al.

FOREIGN PATENT DOCUMENTS

CN 101482736 A 7/2009
JP 2002-108421 A 4/2002
(Continued)

OTHER PUBLICATIONS

Communication dated Jul. 3, 2015 from the State Intellectual Property Office of the P.R.C. in counterpart application No. 201080070199.5.

*Primary Examiner* — Kenneth M Lo
*Assistant Examiner* — Sunray R Chang
(74) *Attorney, Agent, or Firm* — Sughrue Mion, PLLC; Richard C. Turner

(57) ABSTRACT

A system construction supporting tool that supports construction of a programmable controller system, the system construction supporting tool including: a product-specification storage unit that stores therein information related to product specifications of units to be used as elements for constructing the programmable controller system; an arranged-unit-information storage unit that stores therein information related to arrangements of units already arranged in an edition operation on a display screen; a unit-list-display control unit that extracts arrangeable units based on the information stored in the arranged-unit-information storage unit and the information stored in the product-specification storage unit; and a unit-list display unit that displays a list of the units extracted by the unit-list-display control unit on the display screen.

6 Claims, 14 Drawing Sheets

(51) Int. Cl.
*E21B 44/06* (2006.01)
*G05B 19/04* (2006.01)
*G06F 17/50* (2006.01)
*G05B 19/042* (2006.01)
*G05B 19/05* (2006.01)

(52) U.S. Cl.
CPC .............. *G05B 2219/25061* (2013.01); *G05B 2219/25307* (2013.01); *G05B 2219/25336* (2013.01); *G06F 2217/02* (2013.01)

(56) References Cited

FOREIGN PATENT DOCUMENTS

| | | | |
|---|---|---|---|
| JP | 2003-202918 | A | 7/2003 |
| JP | 2006-120070 | A | 5/2006 |
| JP | 2006-259938 | A | 9/2006 |
| JP | 2006-268834 | A | 10/2006 |
| JP | 2010-160582 | A | 7/2010 |

* cited by examiner

FIG.5

| UNIT CONFIGURATION (51) | BASE/CABLE (52) | SLOT NUMBER (53) | UNIT MODEL NAME (54) |
|---|---|---|---|
| UNIT CONFIGURATION 1 | BASE MODEL NAME 1 | POWER SUPPLY | POWER-SUPPLY MODEL NAME 1 |
| | | CPU | CPU MODEL NAME 1 |
| | | 1 | UNIT MODEL NAME 1-1 |
| | | 2 | UNIT MODEL NAME 1-2 |
| | | 3 | UNIT MODEL NAME 1-3 |
| | CABLE MODEL NAME 1 | - | - |
| | BASE MODEL NAME 2 | POWER SUPPLY | POWER-SUPPLY MODEL NAME 2 |
| | | CPU | CPU MODEL NAME 2 |
| | | 1 | UNIT MODEL NAME 2-1 |
| | | 2 | UNIT MODEL NAME 2-2 |
| | | 3 | UNIT MODEL NAME 2-3 |

FIG.7

| SLOT NUMBER | | | | BASE MODEL NAME | | |
|---|---|---|---|---|---|---|
| CPU | 0 | 1 | 2 | BASE MODEL NAME 1 | ... | BASE MODEL NAME n |
| CPU MODEL NAME 1 | CPU MODEL NAME 2 | CPU MODEL NAME 3 | EMPTY | 0 | ... | 1 |
| CPU MODEL NAME 1 | CPU MODEL NAME 2 | CPU MODEL NAME 4 | EMPTY | 0 | ... | 1 |
| CPU MODEL NAME 1 | CPU MODEL NAME 2 | CPU MODEL NAME 5 | EMPTY | 0 | ... | 1 |
| ... | ... | ... | ... | ... | ... | ... |
| CPU MODEL NAME 1 | CPU MODEL NAME 2 | CPU MODEL NAME 3 | CPU MODEL NAME 4 | 1 | ... | 1 |
| CPU MODEL NAME 1 | CPU MODEL NAME 2 | CPU MODEL NAME 3 | CPU MODEL NAME 5 | 1 | ... | 1 |
| CPU MODEL NAME 1 | CPU MODEL NAME 2 | CPU MODEL NAME 3 | CPU MODEL NAME 6 | 1 | ... | 1 |
| ... | ... | ... | ... | ... | ... | ... |

FIG.8

| CPU MODEL NAME | NUMBER OF ATTACHABLE UNITS | | |
| --- | --- | --- | --- |
| | UNIT MODEL NAME 1 | ... | UNIT MODEL NAME n |
| CPU MODEL NAME 1 | 8 | ... | 1 |
| ... | ... | ... | ... |
| CPU MODEL NAME n | 24 | ... | 1 |

| TYPE | MODEL NAME | NUMBER OF I/Os |
|---|---|---|
| BASIC BASE | BASE MODEL NAME 1 | - |
| | ... | ... |
| | BASE MODEL NAME n | - |
| POWER SUPPLY | POWER-SUPPLY MODEL NAME 1 | - |
| | ... | ... |
| | POWER-SUPPLY MODEL NAME n | - |
| SEQUENCER CPU | CPU MODEL NAME 1 | 256 |
| | ... | ... |
| | CPU MODEL NAME n | 4096 |
| ... | ... | ... |
| | ... | ... |
| | ... | ... |
| INPUT | INPUT MODEL NAME 1 | 16 |
| | ... | ... |
| | INPUT MODEL NAME n | 32 |

SYSTEM CONSTRUCTION SUPPORTING TOOL AND SYSTEM CONSTRUCTION SUPPORTING DEVICE

FIELD

The present invention relates to a system construction supporting tool and a system construction supporting device that support construction of a programmable controller (PLC) system including a PLC, a display and the like.

BACKGROUND

A PLC used as a control device for industrial machines or the like includes a base unit and a plurality of units arranged on the base unit. For example, various types of units such as a power supply unit serving as a power source, a CPU unit that manages control of the overall PLC, a motion CPU unit that controls a servomotor with a servo amplifier attached to a driving unit of a production device or an equipment device, an input unit that receives input of a signal from a switch or sensor attached in an appropriate position of a production device or an equipment device, an output unit that outputs a control signal to an actuator or the like, and a communication unit for making connection to a communication network are arbitrarily combined.

The base unit includes a basic base unit and an expansion base unit connected to the basic base unit via an expansion cable. At most one basic base unit can be disposed on a unit configuration. The CPU unit can be attached to only the basic base unit. The expansion base unit can be disposed only when there is a basic base unit. The number of units that can be arranged on a base is restricted by a CPU unit that manages the units. The base unit has slots to which units such as the power supply unit and the CPU unit are attached. Names or numbers such as a power supply slot, a CPU slot, a slot 1, and a slot 2 are assigned to the slots.

A multi CPU system including a PLC having CPU units has a plurality of CPU units attached to a basic base unit, and is used as a system for controlling various units such as an input unit, an output unit and a communication unit, with each CPU unit. In the multi CPU system, positions of slots to which the CPU units can be arranged and the number of the slots are previously defined.

A display used in a control device for industrial machines or the like displays an operation screen created by a user. The display is connected to a PLC or other displays. The user performs control and monitoring of a system through operation on the created screen.

When a control device for a PLC, display or the like is operated, how to construct the system is examined beforehand by the user. Conventionally, when a system is more complicated and larger-sized, a load on the user at the time of system construction is greater. A system construction supporting tool is a tool for reducing the load at the time of system construction.

For example, Patent Literature 1 proposes a technique of a PLC tool device that enables to perform a registration process of CPU units and to display units of which a PLC is constructed for each type in a tree structure. Patent Literature 2 proposes a technique of an engineering supporting system that displays icons of measurement devices and the like on a tree display unit and enables to display connectable connection devices and the like in a list in response to a click of the icon. Patent Literature 3 proposes a technique relating to symbol inputting for a ladder diagram, in which a symbol to be used as an input candidate is searched from an input character string and the search result is displayed on a ladder editor.

CITATION LIST

Patent Literatures

Patent Literature 1: Japanese Patent Application Laid-open No. 2006-268834
Patent Literature 2: Japanese Patent Application Laid-open No. 2003-202918
Patent Literature 3: Japanese Patent Application Laid-open No. 2006-120070

SUMMARY

Technical Problem

In the technique described in Patent Literature 1, units that can not be used to be arranged in view of product specifications may be displayed in a tree depending on a combination of already-arranged units. Accordingly, some selections of units by the user may construct a system including units having arrangement essentially inappropriate in view of PLC specifications. As a result, a rework for modifying the system configuration occurs.

Also in the technique described in Patent Literature 2, determination on whether or not connection of connection devices or the like is appropriate based on a combination of factory automation (FA) devices or devices already arranged is not performed. Therefore, a rework for modifying a system configuration adversely occurs.

In the technique described in Patent Literature 3, targets to be searched are limited to symbols and accordingly unit specifications such as the model name, the type, and the number of inputs/outputs (I/Os) can not be searched at the time of unit selection to edit a system configuration.

The present invention has been achieved in view of the above circumstances, and an object of the present invention is to provide a system construction supporting tool and a system construction supporting device that are suitable in designing a PLC system to examine selection of units included in the system and a general configuration appropriate for system specifications before the system is actually constructed.

Solution to Problem

In order to the above-mentioned problems and achieve the object, the present invention provides a system construction supporting tool that supports construction of a programmable controller system, the system construction supporting tool comprising: a product-specification storage unit that stores therein information related to product specifications of units to be used as elements for constructing the programmable controller system; an arranged-unit-information storage unit that stores therein information related to arrangements of units already arranged in an edition operation on a display screen; a unit-list-display control unit that extracts arrangeable units based on the information stored in the arranged-unit-information storage unit and the information stored in the product-specification storage unit; and a unit-list display unit that displays a list of the units extracted by the unit-list-display control unit on the display screen.

Advantageous Effects of Invention

According to the present invention, when units that can be newly arranged are restricted by already-arranged units in design of a PLC system, system construction can be tried regarding only arrangeable units as selection targets. Therefore, a rework for modifying a system configuration can be reduced.

BRIEF DESCRIPTION OF DRAWINGS

FIG. 5 is an illustration showing an example of a table configuration in storing unit information in an arranged-unit-information storage unit.

FIG. 7 is an illustration showing an example of a table configuration related to CPU units in the product-specification storage unit.

FIG. 8 is an illustration showing an example of a table configuration related to units in the product-specification storage unit.

DESCRIPTION OF EMBODIMENTS

Embodiments of a system construction supporting tool and a system construction supporting device according to the present invention will be explained below in detail with reference to the drawings. The present invention is not limited to these embodiments.

First Embodiment

Figure 1:
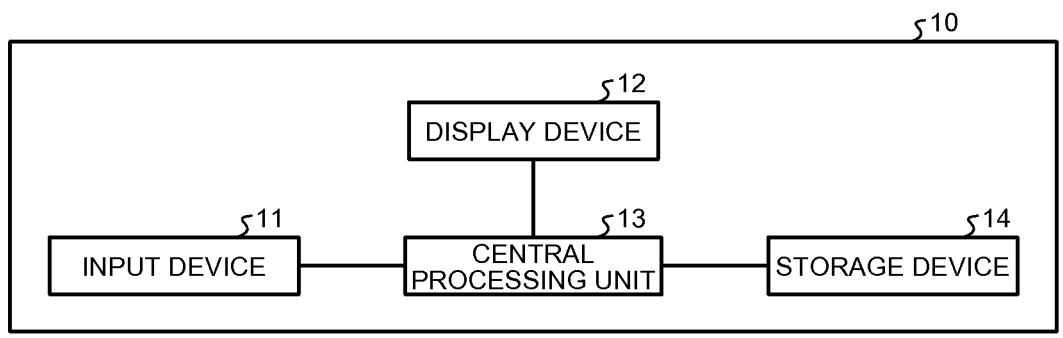
FIG. 1 is a block diagram of a hardware configuration that runs a system construction supporting tool according to the present invention.

FIG. 1 is a block diagram of a hardware configuration (system construction supporting device) that runs a system construction supporting tool according to the present invention. A system construction supporting device 10 has an input device 11 such as a keyboard or a pointing device, a display device (display unit) 12, a central processing unit (control unit) 13, and a storage device (storage unit) 14.

The storage device 14 has a nonvolatile storage device and a volatile storage device (both not shown). The nonvolatile storage device stores therein product specifications and the like. The volatile storage device is arbitrarily used as a work memory for operations of the central processing unit 13. The system construction supporting device 10 is configured by installing a predetermined application program in a personal computer.

Figure 2:
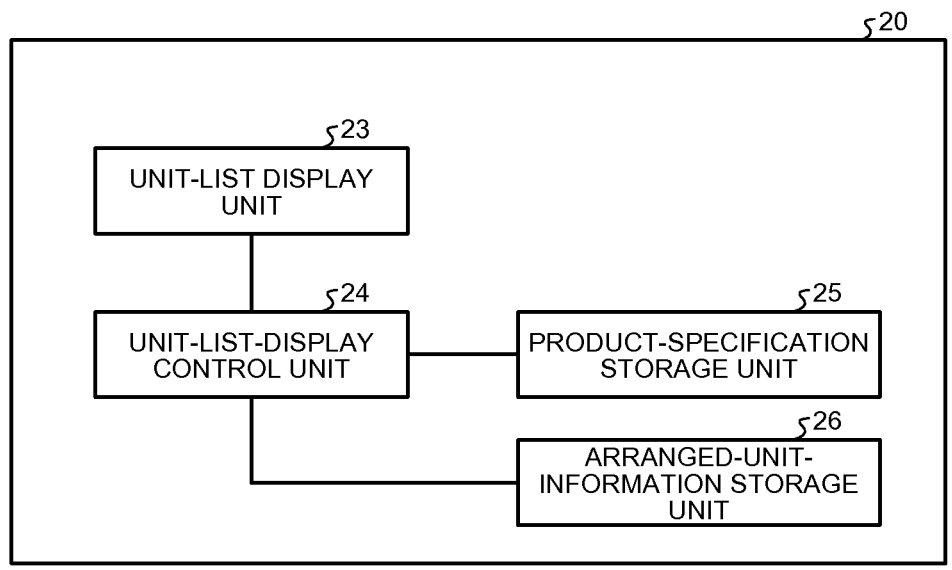
FIG. 2 is a functional block diagram of a system construction supporting tool according to a first embodiment.

FIG. 2 is a functional block diagram of a system construction supporting tool according to a first embodiment. A system construction supporting tool 20 is realized mainly by using the central processing unit 13 and the storage device 14 (see FIG. 1). The system construction supporting tool 20 has a unit-list display unit 23, a unit-list-display control unit 24, a product-specification storage unit 25, and an arranged-unit-information storage unit 26.

The product-specification storage unit 25 stores therein information related to product specifications for various types of units to be used as elements for constructing a PLC system. The arranged-unit-information storage unit 26 stores therein information related to arrangements for units already arranged in an edition operation on a display screen of the display device 12 (see FIG. 1).

The unit-list-display control unit 24 extracts arrangeable units based on the information stored in the arranged-unit-information storage unit 26 and the information stored in the product-specification storage unit 25, and supplies information of the extracted units to the unit-list-display control unit 24. The unit-list display unit 23 displays a list of the units extracted by the unit-list-display control unit 24 on the display screen of the display device 12.

Figure 3:
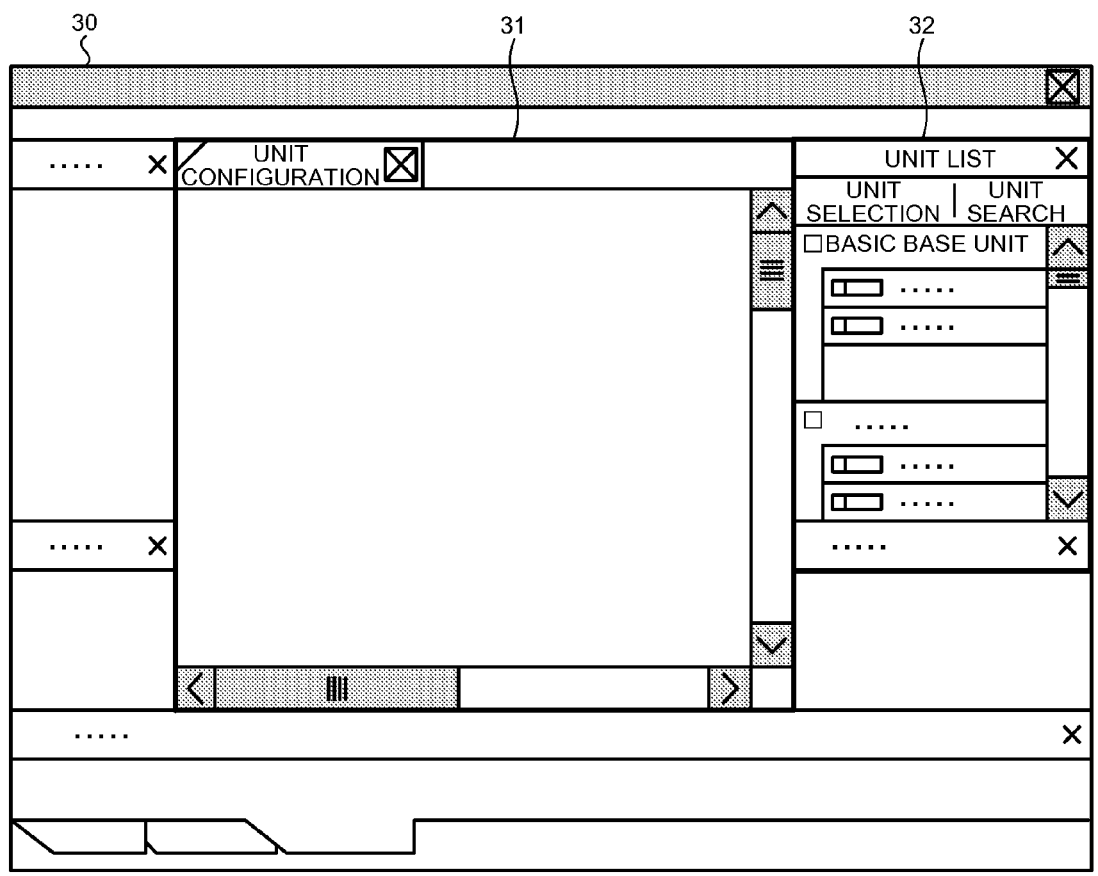
FIG. 3 is an illustration showing an example of a display screen displayed on a display device.

FIG. 3 is an example of the display screen displayed on the display device. A display screen 30 includes a unit-configuration display frame 31 and a unit-list display frame 32. The unit-configuration display frame 31 is a frame for an edition operation to be performed when units are selected and a reasonable layout thereof is examined before a PLC system is actually constructed. The unit-configuration display frame 31 displays a unit configuration being subjected to the edition operation. The unit-list display frame 32 displays a list of model names of units for which arrangements are to be examined in the edition operation.

Figure 4:
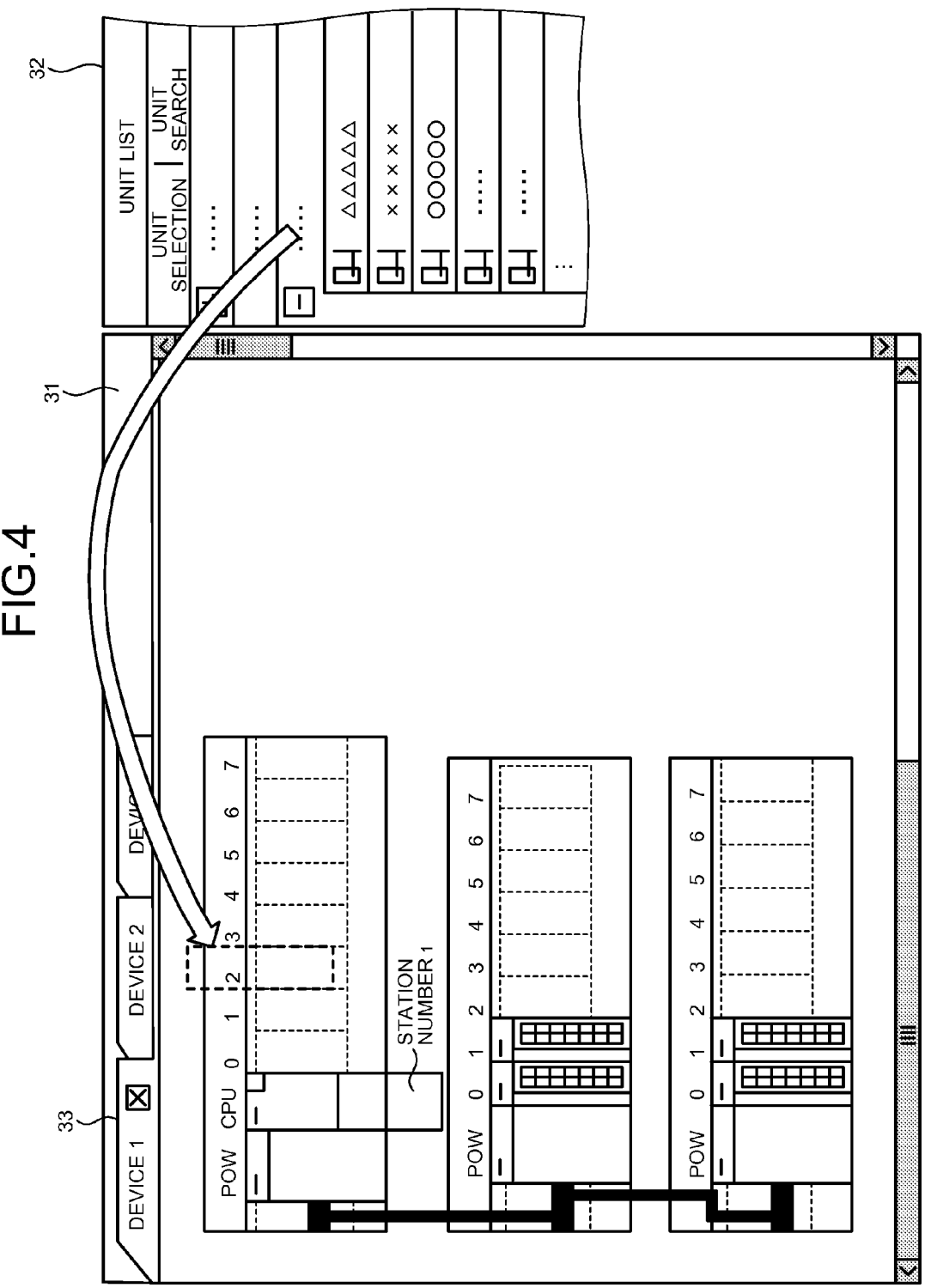
FIG. 4 is an illustration showing one example of an operation using by the system construction supporting tool.

FIG. 4 is one example of an operation of the system construction supporting tool. A user of the system construction supporting tool 20 selects a unit from the list of units displayed in the unit-list display frame 32 through the input device 11 (see FIG. 1) such as a mouse. The selected unit is arranged in a unit configuration being subjected to the edition operation via drag and drop into the unit-configuration display frame 31, for example. The unit-configuration display frame 31 can display a plurality of unit configurations through selection of a tab 33 on which the name of a unit configuration being subjected to the edition operation is indicated. By enabling display of plural unit configurations, the system construction supporting tool can create the unit configurations in parallel.

FIG. 5 is an example of a table configuration used to store unit information in the arranged-unit-information storage unit. An arranged-unit-information storage table 50 stores therein information related to arrangements of arranged units that have been already arranged in the unit-configuration display frame 31 through the operation shown in FIG. 4. A unit configuration field 51 stores therein names of unit configurations displayed in the unit-configuration display frame 31.

A base/cable field 52 stores therein model names of base units already arranged in the unit configuration shown in the unit configuration field 51 or model names of cables between the base units. A slot number field 53 stores therein numbers of slots present on the base units shown in the base/cable field 52. A unit model-name field 54 stores therein model names of units that have been already arranged in the slots shown in the slot number field 53.

Figure 6:
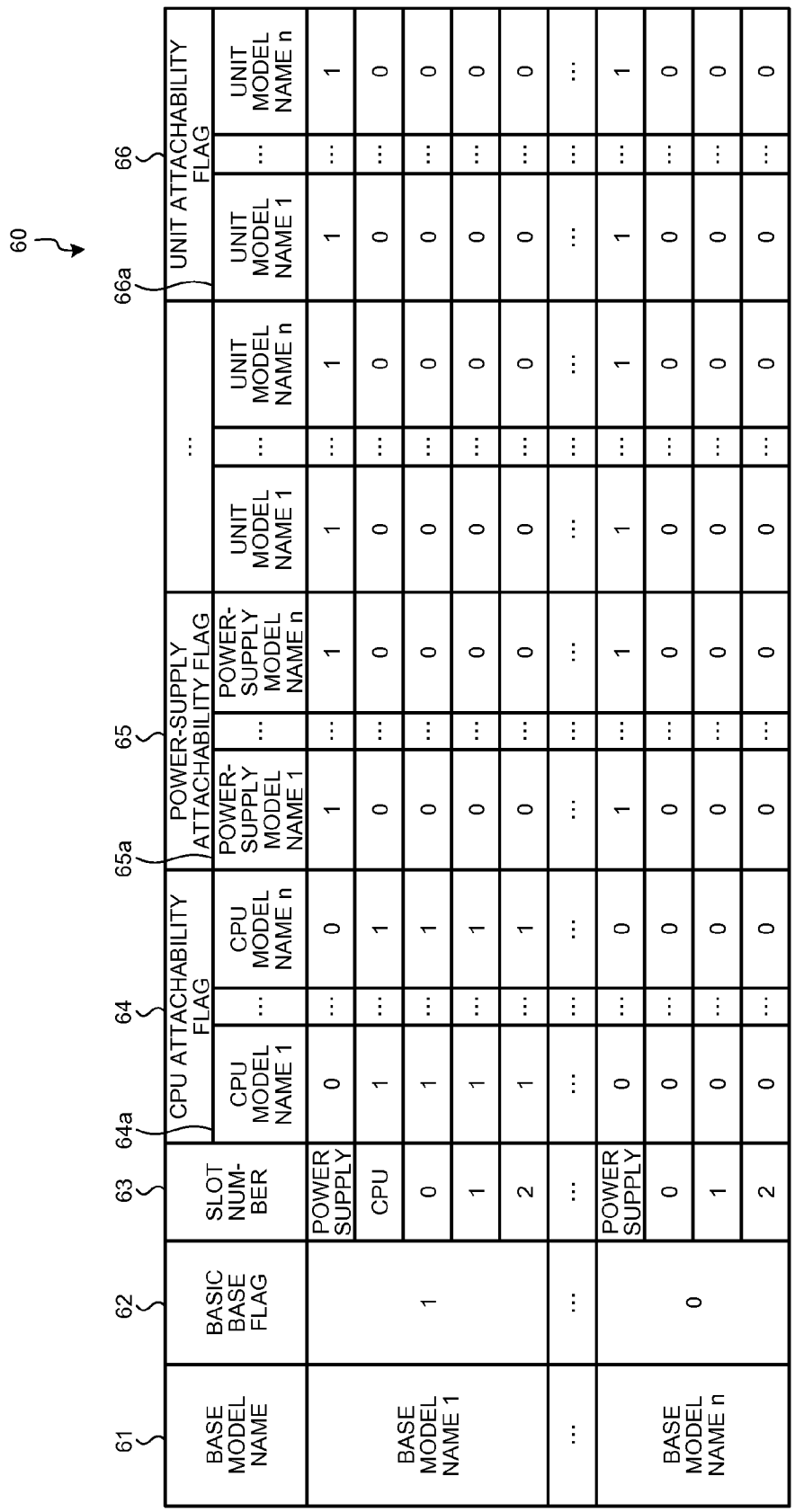
FIG. 6 is an illustration showing an example of a table configuration related to base units in a product-specification storage unit.

FIG. 6 is an example of a table configuration related to base units in the product-specification storage unit. A base product-specification storage table 60 stores therein product specifications of base units. A base model-name field 61 stores therein model names of base units. A basic-base flag field 62 stores therein basic base flags each indicating whether or not a base unit shown in the base model-name field 61 is a basic base unit. For example, a basic base flag "1" denotes a basic base unit and "0" denotes an expansion base unit.

A slot number field 63 stores therein numbers of slots provided in the base units shown in the base model-name field 61. A CPU-attachability flag field 64 has a plurality of CPU model-name fields 64a (for example, numbered with 1 to n). The CPU-attachability flag field 64 stores therein CPU attachability flags each indicating whether or not a CPU unit shown in the CPU model-name field 64a can be attached to the slot shown in the slot number field 63. For example, a CPU attachability flag "1" denotes that a CPU unit is attachable and "0" denotes that a CPU unit is not attachable.

A power-supply-attachability flag field 65 has a plurality of power-supply model-name fields 65a (for example, numbered with 1 to n). The power-supply-attachability flag field 65 stores therein power-supply attachability flags each indicating whether or not a power supply unit shown in the power-supply model-name field 65a can be attached to the slot shown in the slot number field 63. For example, a power-supply attachability flag "1" denotes that a power supply unit is attachable and "0" denotes that a power supply unit is not attachable.

A unit-attachability flag field 66 has a plurality of unit model-name fields 66a (for example, numbered with 1 to n). The unit-attachability flag field 66 stores therein unit attachability flags each indicating whether or not a unit shown in the unit model-name field 66a can be attached to the slot shown in the slot number field 63. For example, a unit attachability flag "1" denotes that a unit is attachable and "0" denotes that a unit is not attachable.

FIG. 7 is an example of a table configuration related to CPU units in the product-specification storage unit. A CPU product-specification storage table 70 stores therein product specifications of CPU units. A slot number field 71 is divided into fields of slot numbers and stores therein combinations 71a of model names of CPU units that are attached in the slots. A base model-name field 72 is divided into a plurality of fields (for example, numbered with 1 to n) and stores therein CPU arrangeability flags 72a each indicating whether or not a CPU unit shown in the combination 71a can be arranged on the base unit having the base model name 1, 2, . . . , or n. For example, a CPU arrangeability flag 72a "1" denotes that a CPU unit can be arranged and "0" denotes that a CPU unit can not be arranged. In this case, "empty" in the combination 71a indicates that no CPU unit is arranged.

Figure 8:
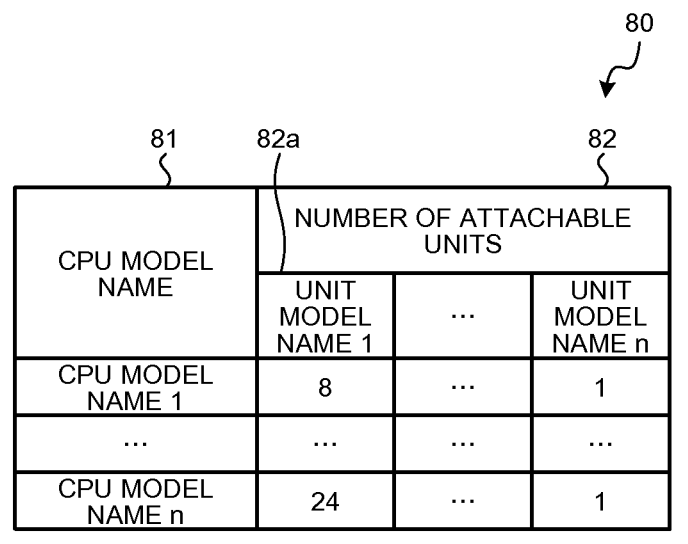

FIG. 8 is an example of a table configuration related to units in the product-specification storage unit. A unit product-specification storage table 80 stores therein product specifications for units. A CPU model-name field 81 stores therein model names of CPU units that can be arranged in the unit-configuration display frame 31. An attachable-unit-number field 82 has a plurality of unit model-name fields 82a (for example, numbered with 1 to n). The attachable-unit-number field 82 stores therein the numbers of units shown in the unit model-name fields 82a, that can be attached to the CPU units shown in the CPU model-name field 81. In the attachable-unit-number field 82, the number of units that can be managed by each CPU unit is shown for each unit model name.

Figure 9:
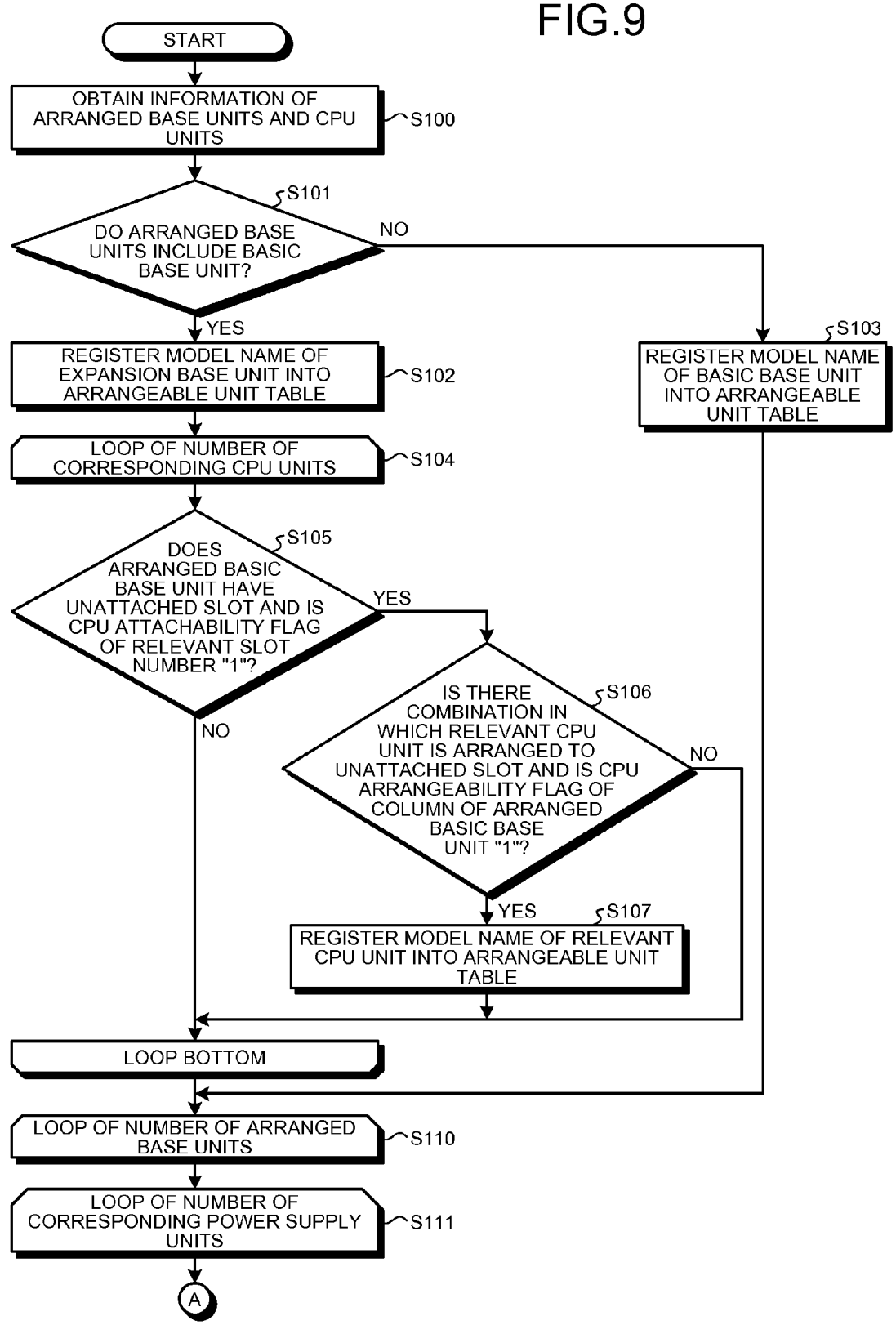
FIG. 9 is a flowchart showing a procedure of an operation performed by a unit-list-display control unit.
Figure 10:
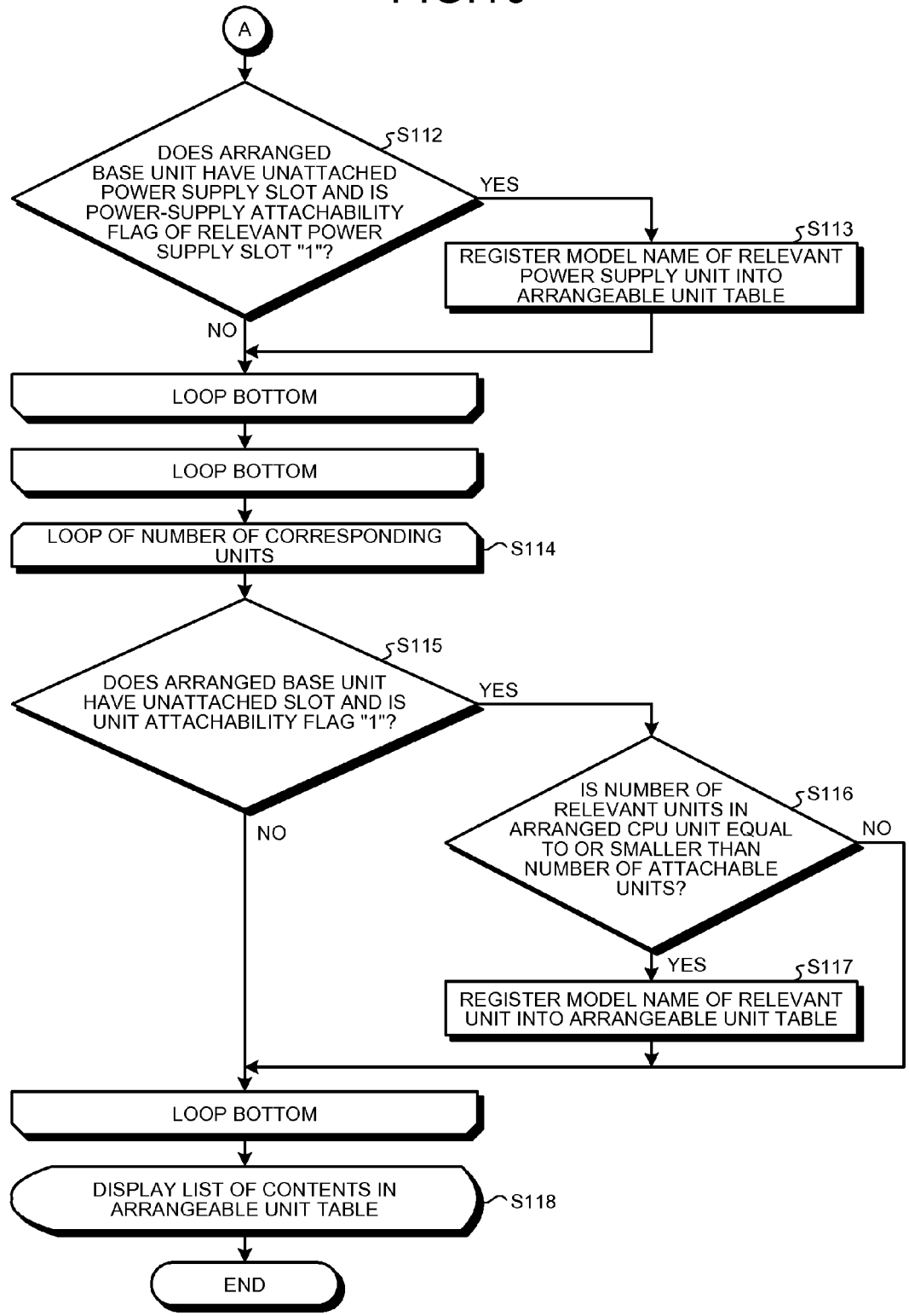
FIG. 10 is a flowchart showing a procedure of an operation performed by the unit-list-display control unit.

FIGS. 9 and 10 are flowcharts of a procedure of an operation performed by the unit-list-display control unit. The unit-list-display control unit 24 (see FIG. 2) obtains information of arranged base units and CPU units from data of a unit configuration being subjected to an edition operation, which are stored in the arranged-unit-information storage unit 26 (Step S100). The unit-list-display control unit 24 refers to the base/cable field 52 in the arranged-unit-information storage table 50 (see FIG. 5).

The unit-list-display control unit 24 refers to the basic-base flag field 62 in the base product-specification storage table 60 (see FIG. 6) with respect to a base unit shown in the base/cable field 52, and determines whether or not the arranged base units include a basic base unit (Step S101). Whether a base unit is a basic base unit is determined based on the corresponding basic base flag stored in the basic-base flag field 62.

When the arranged base units include no basic base unit (NO at Step S101), the unit-list-display control unit 24 registers the model name of a basic base unit having the basic base flag "1" in the base product-specification storage table 60 into an arrangeable unit table (not shown) in the storage device 14 (see FIG. 1) (Step S103). When the arranged base units include a basic base unit (YES at Step S101), the unit-list-display control unit 24 registers the model name of a base unit (expansion base unit) having the basic base flag "0" into the arrangeable unit table (Step S102).

The unit-list-display control unit 24 determines whether or not the arranged basic base unit has a slot to which no unit is attached yet (Step S105). The unit-list-display control unit 24 also refers to a row of CPU model names corresponding to the relevant basic base unit in the base product-specification storage table 60 (see FIG. 6) to determine whether or not the corresponding CPU unit can be attached to the unattached slot (Step S105). Whether or not a CPU unit can be attached to a slot is determined based on the CPU attachability flag of the relevant slot number. In this case, a procedure from Steps S105 to S107 is set as a loop that is repeated by the number of CPU units corresponding to the basic base unit in the base product-specification storage table 60.

When the arranged basic base unit includes no unattached slot or when the CPU attachability flag of the relevant slot number is "0" (No at Step S105), the operation returns to the top of the loop (Step S104) to perform the procedure from Step S105 for another corresponding CPU unit.

When the arranged basic base unit has an unattached slot and the CPU attachability flag of the relevant slot number is "1" (YES at Step S105), the unit-list-display control unit 24 refers to the combinations 71a and the CPU arrangeability flags 72a in a column of the relevant basic base unit in the base model-name field 72 in the CPU product-specification storage table 70 (see FIG. 7). The unit-list-display control unit 24 determines whether or not there is a combination 71a in which the CPU unit subjected to the loop is arranged to the unattached slot (Step S106). The unit-list-display control unit 24 also determines whether or not the relevant CPU unit can be arranged based on whether or not the CPU arrangeability flag 72a in the column of the relevant basic base unit is "1" (Step S106).

When there is a combination 71a in which the relevant CPU unit can be attached to the unattached slot and the CPU arrangeability flag 72a is "1" (YES at Step S106), the unit-list-display control unit 24 registers the model name of the relevant CPU unit into the arrangeable unit table (Step S107). After the registration process of Step S107, the operation returns to the top of the loop (Step S104) to perform the procedure from Step S105 for another corresponding CPU unit. Also when there is no combination 71a in which the relevant CPU unit is attached to the unattached slot or when the CPU arrangeability flag 72a is "0" while there is a combination 71a (NO at Step S106), the operation returns to the top of the loop (Step S104).

The unit-list-display control unit 24 then determines whether or not the arranged base units have a power supply slot to which no power supply unit is attached yet (Step S112). The unit-list-display control unit 24 also refers to a row of power-supply model names corresponding to the relevant base unit in the base product-specification storage table 60 (see FIG. 6) to determine whether or not the corresponding power supply unit can be attached to the unattached power supply slot (Step S112). Whether or not a power supply unit can be attached to a power supply slot is determined based on the power-supply attachability flag of the relevant slot number. In this case, the procedure at Steps S112 and S113 is set as a loop that is repeated by the number of power supply units corresponding to a base unit in the base product-specification storage table 60 and that is repeated by the number of arranged base units.

When there is no unattached power supply slot in the base unit or when the power-supply attachability flag of the unattached power supply slot is "0" (NO at Step S112), the operation returns to the top of the loop (Step S111, S110) to perform the procedure from Step S112 for another corresponding power supply unit or another arranged base unit.

When the arranged base unit has an unattached power supply slot and the power-supply attachability flag is "1" (YES at Step S112), the unit-list-display control unit 24 registers the model name of the relevant power supply unit into the arrangeable unit table (Step S113). After the registration process of Step S113, the operation returns to the top of the loop (Step S111, S110) to perform the procedure from Step S112 for another corresponding power supply unit or another arranged base unit.

The unit-list-display control unit 24 then determines whether or not the arranged base unit has a slot to which no unit is attached yet (Step S115). The unit-list-display control unit 24 also refers to a row of unit model names corresponding to the relevant base unit in the base product-specification storage table 60 (see FIG. 6) to determine whether or not the corresponding unit can be attached to the unattached slot (Step S115). Whether or not a unit can be attached to a slot is determined based on the unit attachability flag of the relevant slot number. In this case, the procedure from Step S115 to Step S117 is set as a loop that is repeated by the number of units corresponding to the base unit in the base product-specification storage table 60.

When the arranged base unit has no unattached slot or when the unit attachability flag of the unattached slot is "0" (NO at Step S115), the operation returns to the top of the loop (Step S114) to perform the procedure from Step S115 for another corresponding unit.

When the arranged base unit has an unattached slot and the unit attachability flag is "1" (YES at Step S115), the unit-list-display control unit 24 refers to the CPU model-name field 81 and the unit model-name field 82a of the corresponding unit in the unit product-specification storage table 80 (see FIG. 8). The unit-list-display control unit 24 determines whether or not the number of the relevant units in the arranged CPU unit is equal to or smaller than the number of attachable units specified in the unit model-name field 82a (Step S116).

When the number of the relevant units is equal to or smaller than the number of attachable units (YES at Step S116), the unit-list-display control unit 24 registers the model name of the relevant unit in the arrangeable unit table (Step S117). After the registration process of Step S117, the operation returns to the top of the loop (Step S114) to perform the procedure from Step S115 for another corresponding unit. Also when the number of the relevant units is larger than the number of attachable units (NO at Step S116), the operation returns to the top of the loop (Step S114).

The unit-list-display control unit 24 then supplies data extracted for the arrangeable unit table at Steps S107, S113 and S117 to the unit-list display unit 23. The unit-list display unit 23 displays a list of contents of the arrangeable unit table in the unit-list display frame 32 on the display screen 30 (see FIG. 3) (Step S118).

In the present embodiment, whether or not registration into the arrangeable unit table is possible is determined based on whether or not the relevant unit can be attached to the arranged base unit or based on whether or not the number is less than the number of units that can be managed by the arranged CPU unit. When already-installed units restrict units that can be newly arranged at the time of design of a PLC system, the system construction supporting tool according to the present embodiment can attempt system construction using only arrangeable units as selection targets. Accordingly, rework for modifying the system configuration can be reduced.

Second Embodiment

Figure 11:
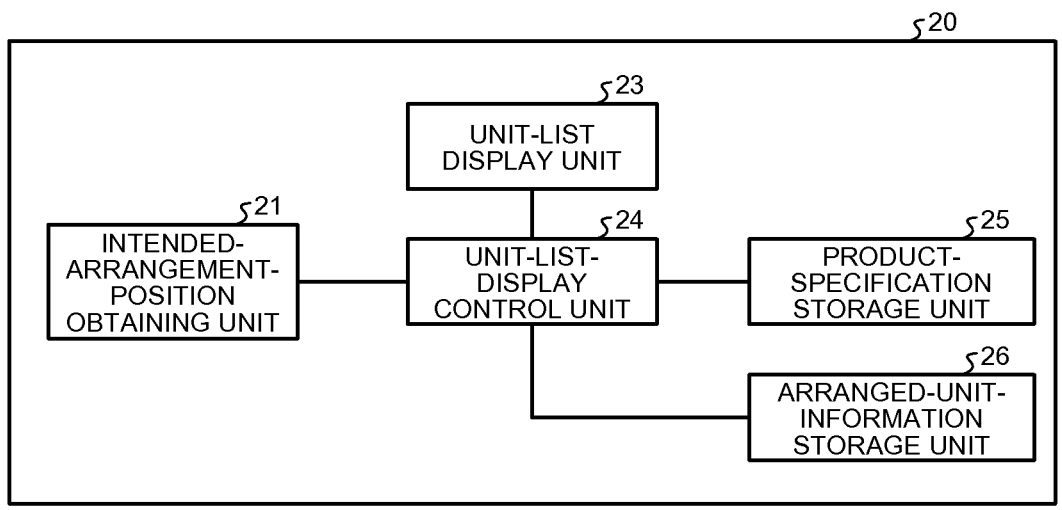
FIG. 11 is a functional block diagram of a system construction supporting tool according to a second embodiment.

FIG. 11 is a functional block diagram of a system construction supporting tool according to a second embodiment. For example, CPU units can be attached only to predetermined slots of a basic base unit. Arrangeable slots are thus restricted in some units. In the present embodiment, information on whether or not a unit can be arranged in an intended arrangement position is referred to in addition to the criteria used in the first embodiment for the determination of whether units can be registered in an arrangeable unit table. A hardware configuration (system construction supporting device) that runs a system construction supporting tool according to the present embodiment is the same as that in the first embodiment (see FIG. 1).

The system construction supporting tool 20 has an intended-arrangement-position obtaining unit 21, the unit-list display unit 23, the unit-list-display control unit 24, the product-specification storage unit 25, and the arranged-unit-information storage unit 26. The intended-arrangement-position obtaining unit 21 obtains information of an intended arrangement position of a unit. The intended-arrangement-position obtaining unit 21 obtains, for example, the slot number of a base unit that is clicked last by a user on the unit-configuration display frame 31 (see FIG. 3) as intended arrangement position information. In the following explanations, a slot as an intended arrangement position is referred to as "intended arrangement slot" in some cases.

The product-specification storage unit 25 stores therein information of whether or not units can be arranged according to arrangement positions. The unit-list-display control unit 24 refers to the information obtained by the intended-arrangement-position obtaining unit 21 and the information stored in the product-specification storage unit 25, and extracts arrangeable units.

Figure 12:
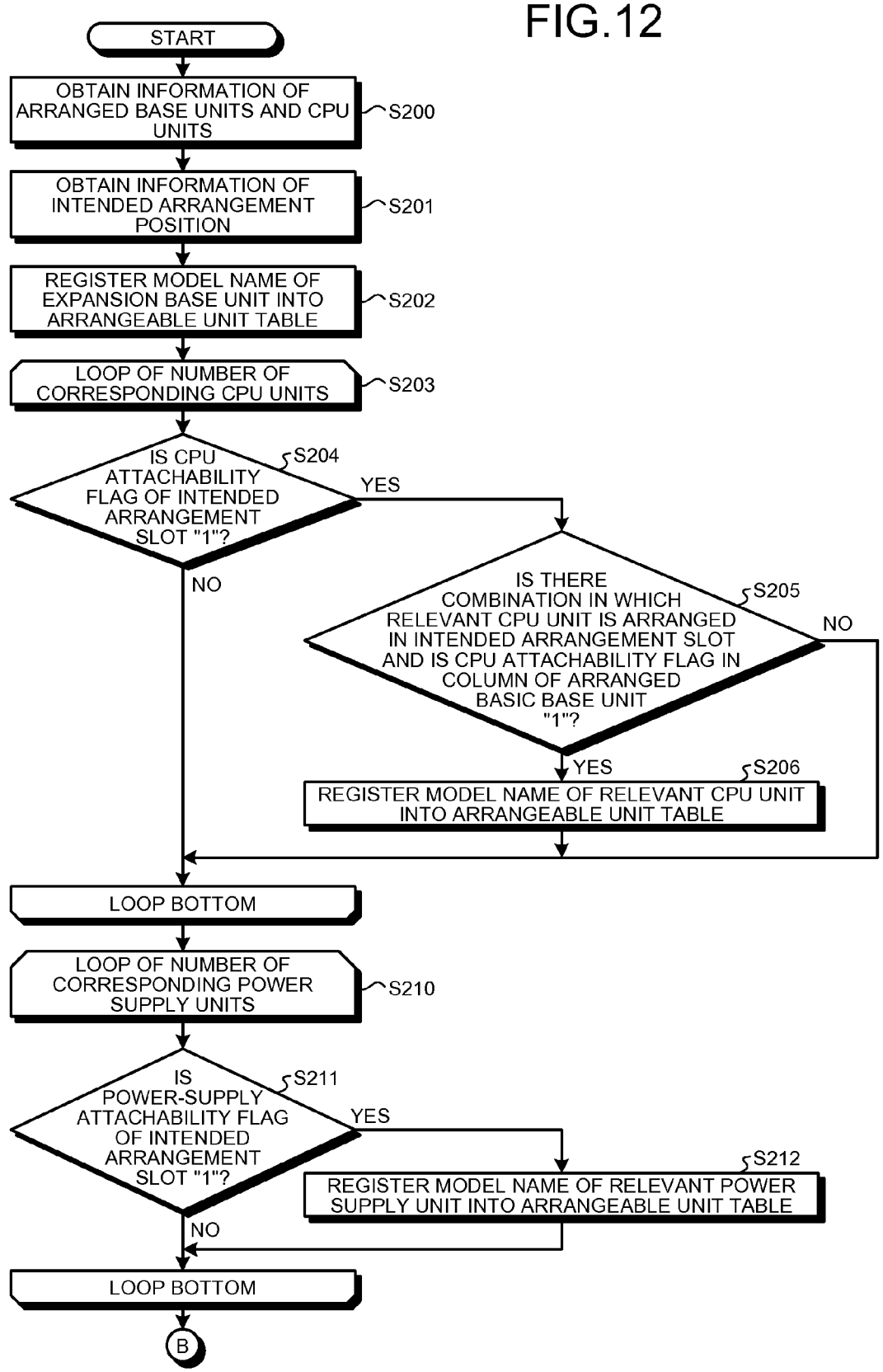
FIG. 12 is a flowchart showing a procedure of an operation performed by the unit-list-display control unit.
Figure 13:
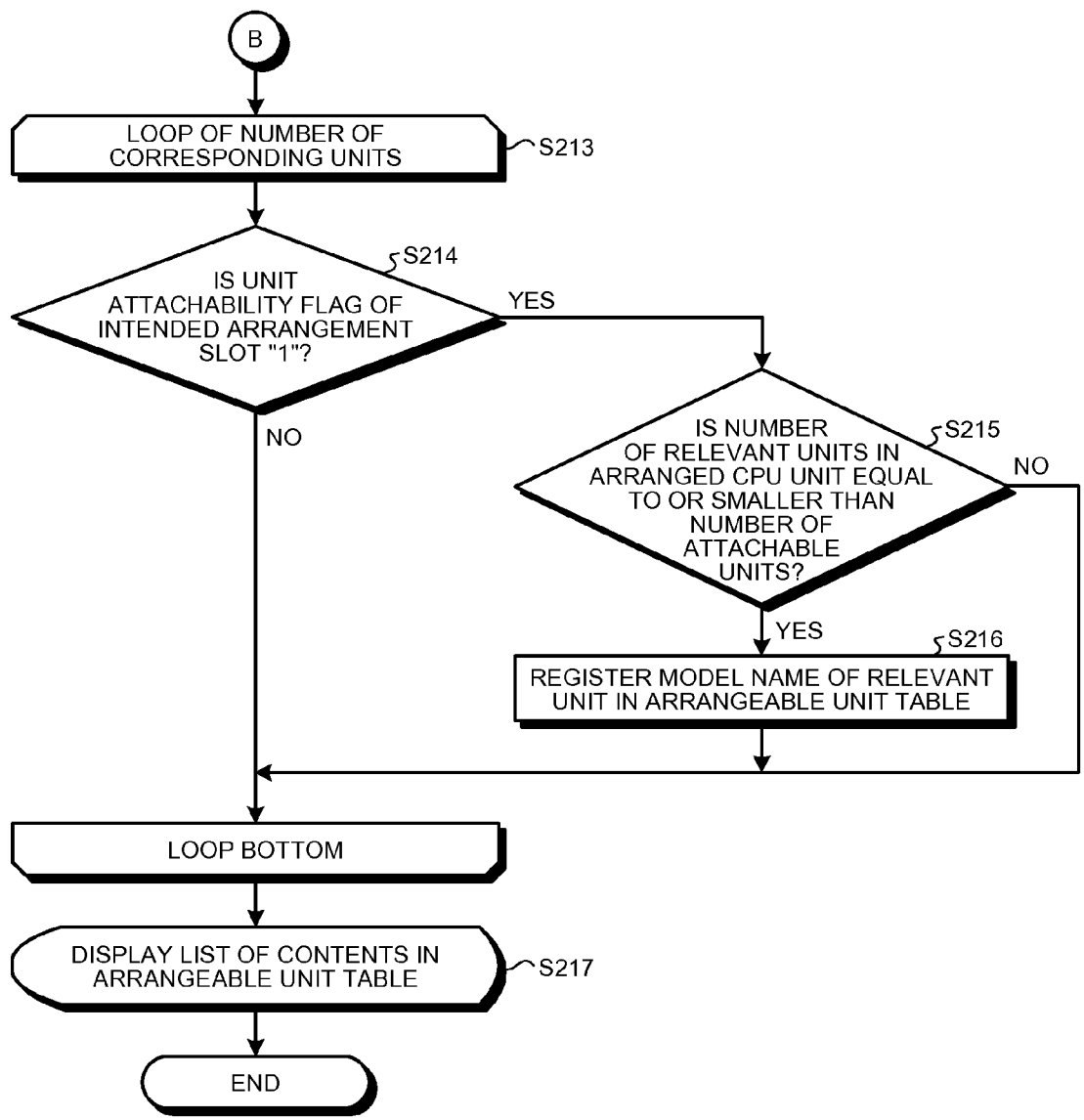
FIG. 13 is a flowchart showing a procedure of an operation performed by the unit-list-display control unit.

FIGS. 12 and 13 are flowcharts of a procedure of an operation performed by the unit-list-display control unit. The unit-list-display control unit 24 obtains information of arranged base units and CPU units from a unit configuration being edited, which is stored in the arranged-unit-information storage unit 26 (Step S200).

The unit-list-display control unit 24 obtains the slot number of the intended arrangement slot from the intended-arrangement-position obtaining unit 21 as the information of an intended arrangement position at which a user intends to arrange a unit (Step S201). The unit-list-display control unit 24 registers the model name of a base unit having the basic base flag "0" (an expansion base unit) into an arrangeable unit table (not shown) (Step S202).

The unit-list-display control unit 24 refers to a row of CPU model names corresponding to the relevant basic base unit in the base product-specification storage table 60 (see FIG. 6) to determine whether or not the corresponding CPU unit can be attached to the intended arrangement slot (Step S204). Whether or not a CPU unit can be attached to a slot is determined based on the CPU attachability flag of the relevant slot number. In this case, the procedure at Steps S204 to S206 is set as a loop that is repeated by the number of CPU units corresponding to the basic base unit in the base product-specification storage table 60.

When the CPU attachability flag of the intended arrangement slot is "0" (NO at Step S204), the operation returns to the top of the loop (Step S203) to perform the procedure from Step S204 for another corresponding CPU unit.

When the CPU attachability flag of the intended arrangement slot is "1" (YES at Step S204), the unit-list-display control unit 24 determines whether or not there is a combination 71a (see FIG. 7) in which the CPU unit subjected to the loop is arranged in the intended arrangement slot (Step S205). The unit-list-display control unit 24 determines whether or not the relevant CPU unit can be arranged based on whether or not the CPU arrangeability flag in a column of the relevant basic base unit is "1" (Step S205).

When there is a combination 71a in which the relevant CPU unit is arranged in the intended arrangement slot and the CPU arrangeability flag 72a is "1" (YES at Step S205), the unit-list-display control unit 24 registers the model name of the CPU unit into the arrangeable unit table (Step S206). After the registration process of Step S206, the operation returns to the top of the loop (Step S203) to perform the procedure from Step S204 for another corresponding CPU unit. Also when there is no combination 71a in which the relevant CPU unit is arranged in the intended arrangement slot or when the CPU arrangeability flag 72a is "0" while there is the combination 71a (NO at Step S205), the operation returns to the top of the loop (Step S203).

The unit-list-display control unit 24 then refers to a row of power-supply model names corresponding to the arranged base unit in the base product-specification storage table 60 (see FIG. 6) to determine whether or not the corresponding power supply unit can be attached to the intended arrangement slot (Step S211). Whether or not a power supply unit can be attached to a slot is determined based on the power-supply attachability flag of the relevant slot number. In this case, the procedure at Steps S211 and S212 is set as a loop that is repeated by the number of power supply units corresponding to the base unit in the base product-specification storage table 60.

When the power-supply attachability flag of the intended arrangement slot is "0" (NO at Step S211), the operation returns to the top of the loop (Step S210) to perform the procedure from Step S211 for another corresponding power supply unit.

When the power-supply attachability flag of the intended arrangement slot is "1" (YES at Step S211), the unit-list-display control unit 24 registers the model name of the relevant power supply unit into the arrangeable unit table (Step S212). After the registration process of Step S212, the operation returns to the top of the loop (Step S210) to perform the procedure from Step S211 for another corresponding power supply unit.

The unit-list-display control unit 24 refers to a row of unit model names corresponding to the arranged base unit in the base product-specification storage table 60 (see FIG. 6) to determine whether or not the corresponding unit can be attached to the intended arrangement slot (Step S214). Whether or not a unit can be attached to a slot is determined based on the unit attachability flag of the relevant slot number. In this case, the procedure from Steps S214 to S216 is set as a loop that is repeated by the number of units corresponding to the base unit in the base product-specification storage table 60.

When the unit attachability flag of the intended arrangement slot is "0" (NO at Step S214), the operation returns to the top of the loop (Step S213) to perform the procedure from Step S214 for another corresponding unit.

When the unit attachability flag of the intended arrangement slot is "1" (YES at Step S214), the unit-list-display control unit 24 refers to the CPU model-name field 81 and the unit model-name field 82a of the relevant unit in the unit product-specification storage table 80 (see FIG. 8). The unit-list-display control unit 24 determines whether or not the number of relevant units in the arranged CPU unit is equal to or smaller than the number of attachable units specified in the unit model-name field 82a (Step S215).

When the number of relevant units is equal to or smaller than the number of attachable units (YES at Step S215), the unit-list-display control unit 24 registers the model name of the relevant unit into the arrangeable unit table (Step S216). After the registration process of Step S216, the operation returns to the top of the loop (Step S213) to perform the procedure from Step S214 for another corresponding unit. Also when the number of relevant units is larger than the number of attachable units (NO at Step S215), the operation returns to the top of the loop (Step S213).

The unit-list-display control unit 24 then supplies the data extracted for the arrangeable unit table at Steps S206, S212 and S216 to the unit-list display unit 23. The unit-list display unit 23 displays a list of contents of the arrangeable unit table in the unit-list display frame 32 on the display screen 30 (see FIG. 3) (Step S217).

In the present embodiment, whether or not registration into the arrangeable unit table can be performed is determined based on whether or not a relevant unit can be attached to an intended arrangement slot (Steps S204, S211 and S214) in addition to the criteria of the first embodiment. By narrowing down arrangeable units according to an intended arrangement position to enable to display a list thereof, selection of units by a user can be further facilitated.

Third Embodiment

Figures 14, 15:
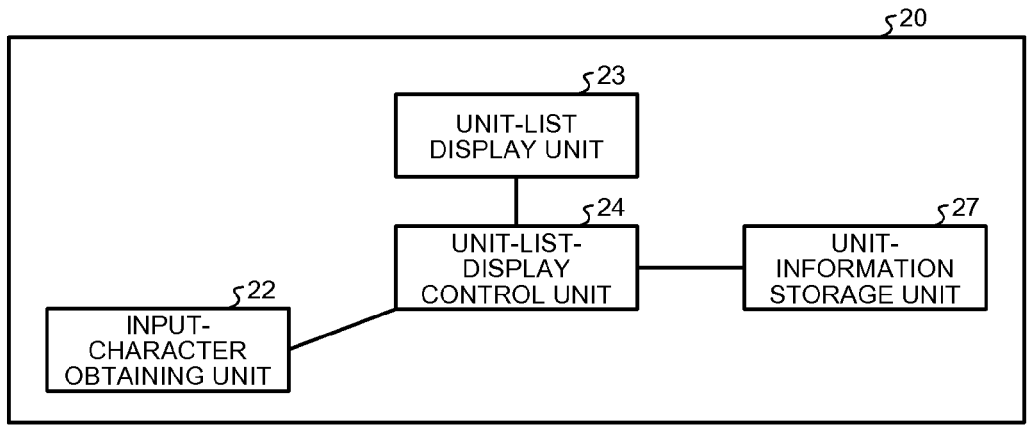
FIG. 14 is a functional block diagram of a system construction supporting tool according to a third embodiment.
FIG. 15 is an illustration showing an example of a table configuration in a unit-information storage unit.

FIG. 14 is a functional block diagram of a system construction supporting tool according to a third embodiment of the present invention. In the present embodiment, units are narrowed down according to the model names, the types and the numbers of inputs/outputs (I/Os) of the units, and then the narrowed units are displayed in a list. A hardware configuration (system construction supporting device) that runs a system construction supporting tool according to the present embodiment is equivalent to that in the first embodiment (see FIG. 1).

The system construction supporting tool 20 has an input-character obtaining unit 22, the unit-list display unit 23, the unit-list-display control unit 24, and a unit-information storage unit 27. The input-character obtaining unit 22 obtains character information inputted from the input device 11 (see FIG. 1) such as a keyboard in an edition operation on the display screen 30 (see FIG. 3). The unit-information storage unit 27 stores therein information of the model name, the type and the number of I/Os of a unit to be used as an element for constructing a PLC system.

The unit-list-display control unit 24 checks the character information obtained by the input-character obtaining unit 22 against character strings indicating information stored in the unit-information storage unit 27, and extracts units having a character string that contains a portion matching with the input character. The unit-list display unit 23 displays a list of the units extracted by the unit-list-display control unit 24 on the display screen 30.

FIG. 15 is an example of a table configuration in the unit-information storage unit. A unit-information storage table 90 has a type field 91, a model name field 92, and a number-of-I/O field 93. The type field 91 stores therein types of units. The model name field 92 stores therein model names of units. The number-of-I/O field 93 stores therein the numbers of I/Os of units.

Figure 16:
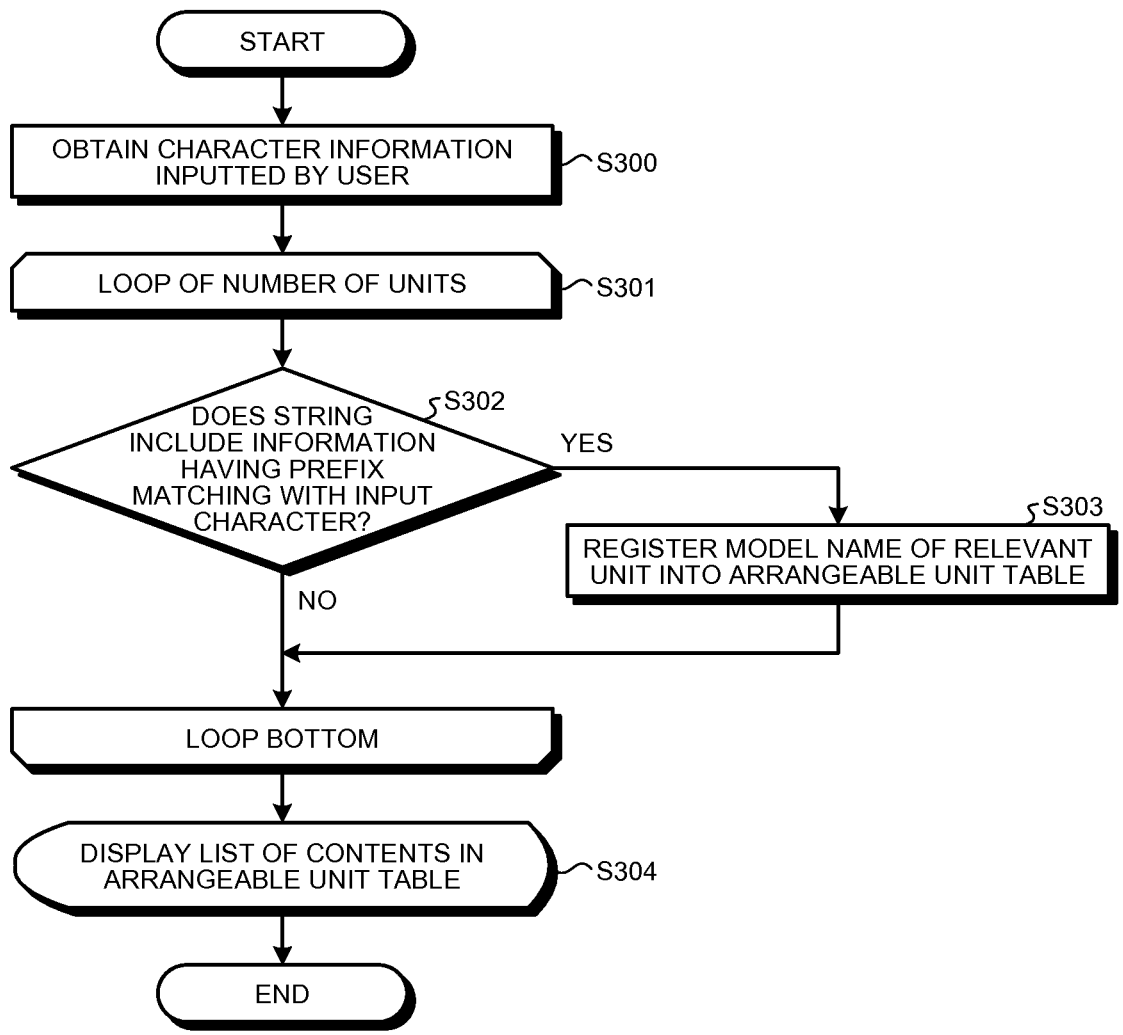
FIG. 16 is a flowchart showing a procedure of an operation performed by the unit-list-display control unit.

FIG. 16 is a flowchart of a procedure of an operation performed by the unit-list-display control unit. The unit-list-display control unit 24 obtains character information inputted by a user from the input-character obtaining unit 22 (Step S300).

The unit-list-display control unit 24 checks the character information obtained from the input-character obtaining unit 22 against character strings indicating the types stored in the type field 91, character strings indicating the model names stored in the model name field 92, and character strings indicating the numbers of I/Os stored in the number-of-I/O field 93. The unit-list-display control unit 24 performs checking for a unit subjected to a loop from the head of each character string indicating the type, the model name, and the number of I/Os so as to determine whether or not the string includes information having a prefix matching with the input character (Step S302). In this case, the procedure at Steps S302 and S303 is set as a loop that is repeated by the number of prepared units.

When any of character strings of the type, the model name and the number of I/Os has a prefix matching with the input character (YES at Step S302), the unit-list-display control unit 24 registers the model name of the relevant unit into an arrangeable unit table (not shown) (Step S303). After the registration process of Step S303, the operation returns to the top of the loop (Step S301) to perform the procedure from Step S302 for another unit. Also when the string includes no information having a prefix matching with the input character (NO at Step S302), the operation returns to the top of the loop (Step S301).

The unit-list-display control unit 24 then supplies the data extracted for the arrangeable unit table at Step S303 to the unit-list display unit 23. The unit-list display unit 23 displays a list of contents of the arrangeable unit table in the unit-list display frame 32 on the display screen 30 (see FIG. 3) (Step S304).

According to the present embodiment, for example, in those instances where a user remembers a head portion of the model name of a unit to be arranged, units to be displayed in a list can be narrowed down. According to the present embodiment, selection of units by the user can be facilitated. The unit-list-display control unit 24 may be adapted to use any information related to units, in addition to the types, the model names and the numbers of I/Os of units, as an object to be cross-checked with the input character.

The system construction supporting tool can have a configuration obtained by adding the input-character obtaining unit 22 and the unit-information storage unit 27 according to the present embodiment to the configuration of the first embodiment. In this case, the system construction supporting tool determines units to be displayed in a list based on the arranged units and the product specifications, and further narrows the units down through cross-checking the units with a character inputted by the user. Accordingly, selection of units by the user can be more facilitated.

The system construction supporting tool may have a configuration obtained by adding the input-character obtaining unit 22 and the unit-information storage unit 27 according to the present embodiment to the configuration of the second embodiment. In this case, the system construction supporting tool determines units to be displayed in a list based on the arranged units, the product specifications and the intended arrangement position, and further narrows the units down by cross-checking the units with a character inputted by the user. Accordingly, selection of units by the user can be more facilitated.

INDUSTRIAL APPLICABILITY

As described above, the system construction supporting tool and the system construction supporting device according to the present invention are useful when constituent units are selected and a reasonable layout thereof is examined before a PLC system is actually constructed.

REFERENCE SIGNS LIST 10 system construction supporting device
11 input device
12 display device
13 central processing unit
14 storage device
20 system construction supporting tool
21 intended-arrangement-position obtaining unit
22 input-character obtaining unit
23 unit-list display unit
24 unit-list-display control unit
25 product-specification storage unit
26 arranged-unit-information storage unit
27 unit-information storage unit
30 display screen
31 unit-configuration display frame
32 unit-list display frame
50 arranged-unit-information storage table
60 base product-specification storage table
70 CPU product-specification storage table
80 unit product-specification storage table
90 unit-information storage table

The invention claimed is:
1. A system construction supporting tool that supports construction of a programmable controller system, the system construction supporting tool comprising:
a product-specification storage unit that stores therein information related to product specifications of units to be used as elements for constructing the programmable controller system;

an arranged-unit-information storage unit that stores therein information related to arrangements of units already arranged in an edition operation on a display screen;

a unit-list-display control unit that extracts arrangeable units based on the information stored in the arranged-unit-information storage unit and the information stored in the product-specification storage unit; and a unit-list display unit that displays a list of the units extracted by the unit-list-display control unit on the display screen, wherein the product-specification storage unit comprises:

with respect to base units each having a plurality of slots, CPU units each controlling the programmable controller system, and other various types of units, a base product-specification storage table that stores therein information indicating whether or not each of the CPU units and the various types of units can be attached to each of the slots as product specifications of the base units;

a CPU product-specification storage table that stores therein information indicating combinations of the CPU units and whether or not the combinations are possible on each of the base units as product specifications of the CPU units; and a unit product-specification storage table that stores therein information indicating the number of units that can be attached to the CPU unit for each of the various types of units as product specifications of the various types of units, and wherein the unit-list-display control unit refers to at least one of the base product-specification storage table, the CPU product-specification storage table, and the unit product-specification storage table according to information obtained from the arranged-unit-information storage unit, and extracts arrangeable units.

2. The system construction supporting tool according to claim 1, further comprising an intended-arrangement-position obtaining unit that obtains information related to an intended arrangement position of a unit, wherein the product-specification storage unit stores therein information of arrangeability of units according to the intended arrangement position, and the unit-list-display control unit refers to the information obtained by the intended-arrangement-position obtaining unit and the information stored in the product-specification storage unit, and extracts arrangeable units.

3. The system construction supporting tool according to claim 1, further comprising:

a product-specification storage unit that stores therein information related to product specifications of units to be used as elements for constructing the programmable controller system; and an arranged-unit-information storage unit that stores therein information related to arrangements of units already arranged in the edition operation on the display screen, wherein the unit-list-display control unit extracts arrangeable units based on the information stored in the arranged-unit-information storage unit and the information stored in the product-specification storage unit.

4. The system construction supporting tool according to claim 3, further comprising an intended-arrangement-position obtaining unit that obtains information related to an intended arrangement position of a unit, wherein the product-specification storage unit stores therein information of arrangeability of units according to the intended arrangement position, and the unit-list-display control unit refers to the information obtained by the intended-arrangement-position obtaining unit and the information stored in the product-specification storage unit, and extracts arrangeable units.

5. A system construction supporting device that supports construction of a programmable controller system, the system construction supporting device comprising:

a display unit that displays a display screen;

a storage unit that stores therein information related to product specifications of units to be used as elements for constructing the programmable controller system and information related to arrangements of arranged units that are already arranged in an edition operation on the display screen; and a control unit that extracts arrangeable units based on the information related to the product specifications and the information related to the arrangements of the arranged units stored in the storage unit, and displays a list of the extracted units on the display screen wherein the storage unit stores therein:

with respect to base units each having a plurality of slots, CPU units each controlling the programmable controller system, and other various types of units, a base product-specification storage table that stores therein information indicating whether or not each of the CPU units and the various types of units can be attached to each of the slots as product specifications of the base units;

a CPU product-specification storage table that stores therein information indicating combinations of the CPU units and whether or not the combinations are possible on each of the base units as product specifications of the CPU units; and a unit product-specification storage table that stores therein information indicating the number of units that can be attached to the CPU unit for each of the various types of units as product specifications of the various types of units, and wherein the control unit refers to at least one of the base product-specification storage table, the CPU product-specification storage table, and the unit product-specification storage table according to information of the arranged units obtained from the storage unit, and extracts arrangeable units.

6. The system construction supporting device according to claim 5, wherein the storage unit stores therein information of model names, types and number of inputs and outputs of units, and the control unit checks character information inputted in an edition operation on the display screen against character strings indicating the information stored in the storage unit, and extracts units having the character strings that contain a portion matching with the character information.

* * * * *